United States Patent [19]

Tsuzuki et al.

[11] Patent Number: 4,970,661
[45] Date of Patent: Nov. 13, 1990

[54] PERFECTING PRINTER AND METHOD FOR CONTROLLING DOUBLE-FACE PRINTING OPERATION THEREOF

[75] Inventors: Toru Tsuzuki, Okazaki; Masahiro Murakami, Hekinan; Hiroyuki Funahashi, Seto; Hajime Usami, Nagoya; Kiyoshi Takahashi, Aichi, all of Japan

[73] Assignee: Brother Kogyo Kabushiki Kaisha, Aichi, Japan

[21] Appl. No.: 478,513

[22] Filed: Feb. 12, 1990

[30] Foreign Application Priority Data

Feb. 14, 1989 [JP] Japan .................................. 1-34272

[51] Int. Cl.⁵ ............................................ G06F 15/00
[52] U.S. Cl. .................................... 364/519; 355/202; 346/154
[58] Field of Search .................... 355/23, 24, 319, 320, 355/202, 204; 346/154, 100; 364/519, 520

[56] References Cited

U.S. PATENT DOCUMENTS

| | | | |
|---|---|---|---|
| 4,505,576 | 3/1985 | Sugiura et al. | 355/202 |
| 4,639,791 | 1/1987 | Masaki | 364/520 |
| 4,855,767 | 8/1989 | Sato et al. | 346/154 |

*Primary Examiner*—Michael L. Gellner
*Assistant Examiner*—Khanh Dang
*Attorney, Agent, or Firm*—Oliff and Berridge

[57] ABSTRACT

A perfecting printer for performing a double-face printing operation of printing images on obverse and reverse faces of at least one sheet on the basis of a series of print data inputted from an external device and a method for controlling the double-face printing operation of the printer. The perfecting printer includes a page memory for storing as page data at least both of the first and second print data in the series of the print data, and a control unit for printing the first and second print data on both of the obverse and reverse faces of the sheet when it is judged that the page data to be printed on the reverse face of the sheet exists in the memory and promptly printing only the first print data on the obverse face of the sheet when it is judged that the page data to be printed on the reverse face of the sheet does not exist in the memory.

11 Claims, 2 Drawing Sheets

PERFECTING PRINTER AND METHOD FOR CONTROLLING DOUBLE-FACE PRINTING OPERATION THEREOF

BACKGROUND OF THE INVENTION

The present invention relates to a perfecting printer for printing images on both of obverse and reverse faces of a sheet to perform a double-face printing operation, and more particularly to a perfecting printer having a control unit for controlling the double-face printing operation of printer.

As disclosed in Japanese Laid-Open Patent Publication No. 59(1984)-179354, there has been already known a perfecting printer such as a laser printer capable of performing a perfecting (double-face) printing operation in which data such as character data, graphic data or the like are printed on both of obverse and reverse faces of a sheet. When the double-face printing operation is carried out for plural sheets in the perfecting printer, each of the sheets must be successively discharged with the printed face thereof placed downwardly in order to sequentially print a series of pages for a short time period. The sheet discharging operation as described above is generally called "face-down discharging operation".

Further, in order to print images on both of the obverse and reverse faces of a sheet, it is required to pass the sheet through a recording unit of the printer two times while the face to be printed is reversed each time. Therefore, the perfecting printer is provided with a sheet path change-over or switching mechanism and a sheet reversing path.

In order to miniaturize the housing of the perfecting printer and the sheet feed path thereof and to simplify a control operation of the sheet switching mechanism, the following construction has been proposed for the perfecting printer adopting the face-down discharging method: A face-down discharge tray is disposed at an upper portion of the housing of the printer, and the sheet feed path which extends to the discharge tray is branched from the sheet reversing path and bent in a U-shape at a suitable position in the printer.

In a case where the sheet feed path having the above construction is utilized in the printer, the face-down discharging operation inevitably requires the following printing operation: The reverse face (second page) of a sheet is firstly printed and then the obverse face (first page) is printed. Accordingly, print data for at least two pages must be entirely stored into a memory to print images on both of the obverse and reverse faces of a sheet.

In this perfecting printer, even if no print data exists for the reverse face of a sheet, an printing operation for the obverse face of the sheet is commenced after completion of a printing operation for the reverse face of the sheet, which would be carried out if the print data for the reverse face exists. Therefore, a period required for printing an image on one face of a sheet because no print data for the other face exists is the same as the period for printing images on both faces of the sheet because the print data for the obverse and reverse faces of the sheet exist. Accordingly, the perfecting printer as described above has an inefficient printing operation.

The above event where there is no print data for the reverse face of a sheet occurs, for example, in the following case. When a series of sentences are printed on obverse and reverse faces of plural sheets in the double-face printing operation, a part of the sentences corresponding to one paragraph is ended at an intermediate portion of a third page, and there is a blank on the remaining portion of the third page and a full blank on the next page (reverse face) and a next paragraph is started at a fifth page.

In summary, in the double-face printing operation of the conventional perfecting printer, a printing operation is promptly conducted on the reverse face of the sheet even if there is no print data therefor. Accordingly, a total printing period for printing only the print data for the obverse face on the sheet would be the same as that required for printing both print data for the obverse and reverse face on the sheet. Accordingly, the perfecting printer needs a surplus and unnecessary time to conducting the double-face printing operation on the sheets, at least one of which has a reverse face to be printed as a blank page.

SUMMARY OF THE INVENTION

The present invention is provided to eliminate the above-described disadvantage, and it is an object of the present invention to provide a perfecting printer and method for controlling the same in which a double-face printing operation is promptly conducted on a sheet even if there is no print data for the reverse face of the sheet.

In order to attain the above objects, according to one aspect of this invention, a perfecting printer images are printed on obverse and reverse faces of at least one sheet on the basis of a series of print data including first print data and second print data to be printed on the obverse and reverse faces of the sheet, respectively, the print data being inputted from an external device, comprising memory means for storing as page data at least both of the first and second print data in the series of the print data, printing means for successively printing the first and second print data stored in the memory means on the obverse and reverse faces of the sheet, judging means for judging as to whether the page data to be printed on the reverse face of the sheet exists in said memory, and control means for controlling the printing means to print the first and second print data on both of the obverse and reverse faces of the sheet when it is judged that the page data to be printed on the reverse face of the sheet exists in said memory means, and to promptly print only the first print data on the obverse face of the sheet when it is judged that the page data to be printed on the reverse face of the sheet does not exist in the memory means.

According to the perfecting printer of this invention, if both print data are provided to the obverse and reverse faces of a sheet, a double-face printing operation is carried out for printing images on the reverse and obverse faces of a sheet in this order. However, if only a print data is provided to the obverse face of the sheet and no print data is provided to the reverse face of the sheet, a single printing operation is promptly carried out to print an image on the obverse face of the sheet. More specifically, in the perfecting printer utilizing a face-down type sheet discharging method, after the print data for the obverse and reverse faces of a sheet are stored in the memory, the double-face printing operation is performed in which a print data for the reverse face of a sheet is printed and then a print data for the obverse face of the sheet is printed. However, if it is judged that no print data for the reverse face of the sheet exists, the single-face printing operation of printing only the print data for the obverse face of the sheet stored in the memory is immediately carried out without executing the printing operation for the reverse face of the sheet. Therefore, the time required for performing the printing operation is reduced, and printing efficiency is enhanced.

DETAILED DESCRIPTION OF THE PREFERRED EMBODIMENTS

Figure 1:
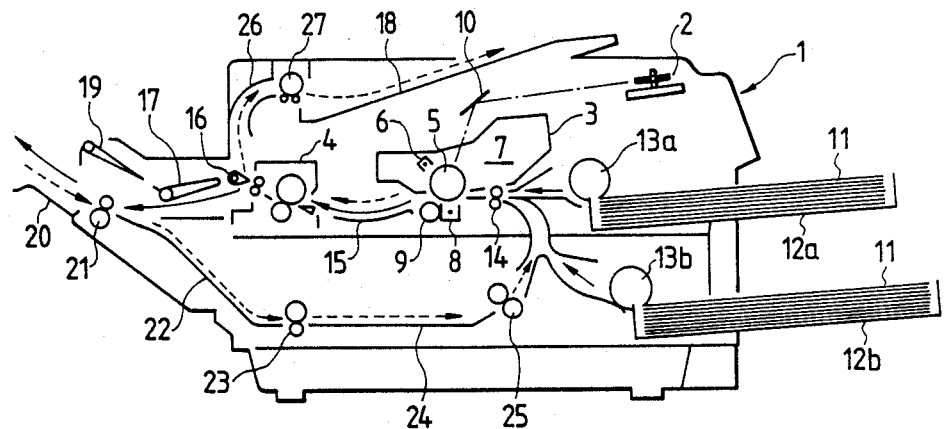
FIG. 1 is a schematic view showing an overall arrangement of a perfecting printer according to an embodiment of the present invention.

FIG. 1 shows an overall arrangement of a perfecting printer according to an embodiment of the present invention.

In the present embodiment, the perfecting printer is used in the form of a laser printer. The laser printer includes a housing 1 accommodating therein a laser/scanner unit 2, an image recording processor 3, and an image fixing unit 4. The image recording processor 3 comprises a photosensitive drum 5, a main charger 6, an image developing unit 7, a transfer charger (transfer unit) 8, and a separator 9. The laser/scanner unit 2 applies a light image of a laser beam having a recording data on characters, graph patterns, or the like, to the photosensitive drum 5 through a reflecting mirror 10, thereby forming a latent image on the photosensitive drum 5. The latent image thus obtained is then developed into a visible image in the image developing unit and transferred onto a sheet by the transfer charger 8.

The laser printer also has a sheet feed system including two sheet cassettes 12a, 12b for accommodating sheets 11, which are mounted in one side of the housing 1. A sheet 11 is fed to the transfer unit 8 by feed rollers 13a, 13b and resist rollers 14. After an image has been transferred to the sheet 11 and the sheet 11 has been discharged from the image recording processor 3, it is fed through a feed guide 15 to the image fixing unit 4. Feed path switching levers 16 and 17 are disposed downstream of the image fixing unit 4. The feed path switching lever 16 selectively directs the sheet 11 toward a face-down tray 18 on the top of the housing 1 or toward a face-up tray 19 and a reverse tray 20 on the opposite side of the housing 1. The feed path switching lever 17 selects either the face-up tray 19 or the reverse tray 20.

A sheet on the reverse tray 20 can be reversed in direction by a device which comprises reverse rollers 21, a reverse feed path 22, skew-feed rollers 23, and a reversed sheet tray 24. Refeed rollers 25 are also provided which feeds a sheet on the reversed-sheet tray 24 again toward the resist rollers 14 on their upstream side. A sheet discharge roller 27 is disposed in a feed path 26 extending to the face-down tray 18.

The solid-line arrows in FIG. 1 represent a sheet feed path or route for feeding a sheet therealong when the sheet is first printed in a double-face printing modes, and the broken-line arrows in FIG. 1 show a sheet feed path or route for feeding a sheet therealong when the sheet is printed after it is reversed.

Figure 2:
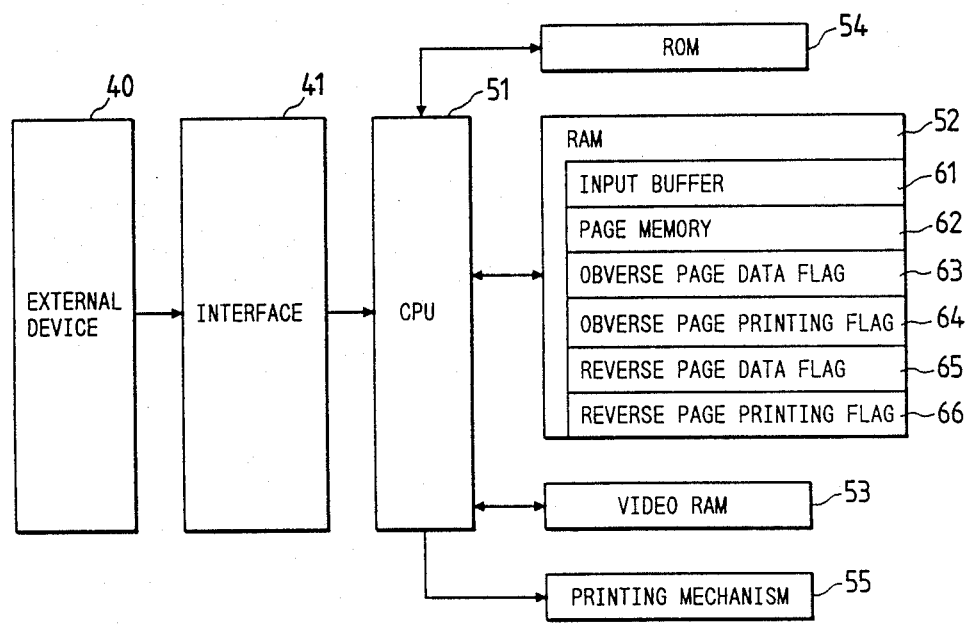
FIG. 2 is a block diagram showing a control system in the perfecting printer as shown in FIG. 1.

FIG. 2 is a block diagram of a control system in the present printing device.

The control system includes a CPU 51 for performing control operations of elements constituting the printer, a RAM 52, a video RAM 53, a ROM 54, and a printing mechanism 55 which includes the above-described laser/scanner unit 2 and the image recording processor 3. The video RAM 53 is adapted to convert a print data stored in a page memory 62 (described later) into a corresponding image data through a character generator. The ROM 54 is adapted to store a control program and a character generating program serving as a character generator.

The RAM 52 includes an input buffer 61 for temporarily storing therein print data transmitted from an external device such as a host computer 40, a page memory 62 for storing the print data stored in the input buffer 61 as a page data together with position data indicative of recording positions on a sheet, an obverse page data flag 63 indicating that all data for each obverse face (odd-numbered page) are stored in the page memory 62, an obverse page printing flag 64 indicating that a print data to be printed on the obverse face of a sheet exists, a reverse page data flag 65 indicating that all data for each reverse face (even-numbered page) are stored in the page memory 62, and a reverse page printing flag 66 indicating that a print data to be printed on the reverse face of a sheet exists.

Figure 3:
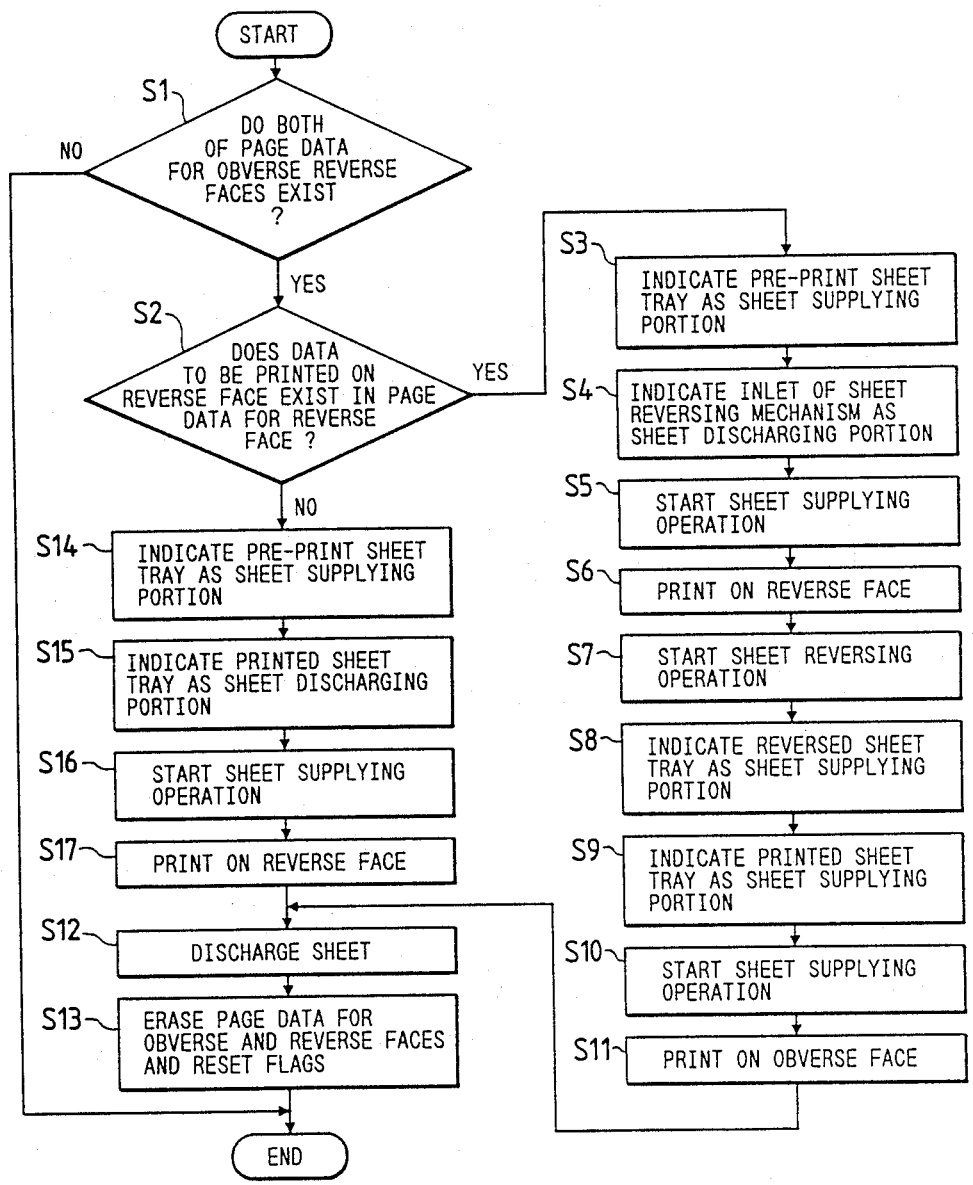
FIG. 3 is a flowchart showing a series of a control operation of the control system as shown in FIG. 2.

An operation of the control system will now be described below with reference to the flowchart of FIG. 3 which illustrates a series of control operations of the control system.

Print data are inputted from the external device such as the host computer 40 through an interface 41 into the CPU 51. The print data are temporally stored in the input buffer 61 and then stored as the page data in the page memory. In this case, when all of the print data for the obverse face of a sheet are stored in the page memory 62, the obverse page data flag 63 is set, and if the print data contain graphic or character data to be recorded, the obverse page printing flag 64 is set. Further, when all of the print data for the reverse face are stored in the page memory 62, the reverse page data flag 65 is set, and if the print data contain data to be recorded, the reverse page printing flag 66 is set. If a dummy data indicative of full blank page is stored, the reverse page printing flag 66 is not set.

When the double-face printing mode is used in the perfecting printer, the printing operation is initiated only when both page data for the obverse and reverse faces of a sheet are stored in the RAM 52. That is, the CPU 51 judges whether or not the both page data flags 63 and 65 of the RAM 52 are set, that is, it is judged in a step S1 whether or not both of the obverse and reverse page data are stored in the page memory 62. If it is judged that both of the page data are stored, the CPU judges whether or not the reverse page printing flag 66 is set, that is, it is judged in a step S2 whether or not the character data and/or graphic data to be recorded on the reverse face of the sheet exists.

If it is judged that the data to be recorded on the reverse face exists, the CPU 51 provides an instruction that the sheet should be supplied from a pre-print sheet tray such as the sheet cassette 12a accommodating a stack of sheets which have not subjected to a printing operation (in a step S3) and another instruction that the sheet is discharged to an inlet portion of the sheet reversing mechanism after printing (in a step S4). Thereafter, the sheet 11 is supplied from the sheet cassette 12a to the printing mechanism 55 by the feed roller 13a in a step S5. When the sheet reaches the printing mechanism 55, a predetermined image recording process is executed for the reverse page of the sheet in accordance with a page data which has stored in the page memory 62 and converted into the corresponding image data in the video RAM 53.

Thereafter, in Step S7, the sheet 11 is traveled below the switching levers 16 and 17 and passes through the reverse rollers 21, and then reaches the reverse tray 20. Then, the reverse rollers 21 are reversely rotated, so that the sheet 11 is supplied to the reversed sheet tray 24 through the reverse feed path 22 and the skew-feed roller 23.

Thereafter, the CPU 53 further provides an instruction that the sheet should be fed from the reversed sheet tray 24 in a step S8, and another instruction that the sheet is discharged to the printed sheet tray, i.e., the face-down tray 18 in a step S9. As a result of the instructions, the refeed rollers 25 are rotated to feed the sheet 11 from the reversed sheet tray 24 to the printing mechanism 55 in a step S10. In a step S11, the printing mechanism 55 executes a predetermined image recording process in accordance with the page data stored in the video RAM 53 to thereby printing an image on the obverse face of the sheet. Next, in step S12, the sheet 11 is passed above the switch lever 16 and delivered to the face down tray 18 through the feed path 26 and the discharge roller 27 because the switch lever 16 is pivoted to its downward position. Thereafter, the data stored in the page memory 62 and the video RAM 53 are erased, and each of the flags is reset in Step S13 to complete the double-face printing operation for a single sheet.

On the other hand, in Step S2, if the data to be recorded does not exist for the reverse face of the sheet, that is, only a dummy data indicative of the fully blank page is provided to the reverse face of the sheet, the single-face printing operation is promptly conducted on the print data for the obverse face of the sheet. That is, the print data for the obverse face is promptly printed on the reverse face of the sheet, and then the sheet having an image corresponding to the print data for the obverse face is discharged to the outside of the printer.

That is, the CPU 53 provides an instruction that the sheet should be supplied from the pre-print sheet tray (sheet cassette 12a) in Step S14 similar to the Step S3, and provides another instruction the sheet should be discharged to the printed sheet tray (face-down tray 18) in Step S15. Based on the instructions of the CPU 53, the sheet 11 is supplied from the sheet cassette 12a by the sheet feed roller 13a, and is delivered to the printing mechanism 55 in Step S16. Thereafter, in a step S17, a predetermined image recording process is executed to print an image on the obverse face of the sheet in accordance with a page data which has been stored in the page memory 62 and converted into the image data by the video RAM 55. Subsequently, the routine proceeds into the Step S12, so that the sheet 11 is fed to the face-down tray 18. In a step S13, the data stored in the page data memory 62 and the video RAM 53 are erased and each of the flags 63 through 66 is reset, thereby terminating the printing operation.

In addition to the above operations, if it is judged in the step S1 that the obverse and reverse date flags 63 and 65 are not set, that is, if it is judged that neither the obverse page data nor the reverse page data are stored in the page memory 62, the printing operation is not initiated until it is judged that all of the page data for the obverse and reverse faces of the sheet are not be stored in Step S1.

According to the perfecting printer of this invention as described above, if both print data are provided to the obverse and reverse faces of a sheet, a double-face printing operation is carried out for printing images on the reverse and obverse faces of a sheet in this order. However, if only a print data is provided to the obverse face of the sheet and no print data is provided to the reverse face of the sheet, a single printing operation is promptly carried out to print an image on the obverse face of the sheet. More specifically, in the perfecting printer utilizing a face-down type sheet discharging method, after the print data for the obverse and reverse faces of a sheet are stored in the memory, the double-face printing operation is performed in which a print data for the reverse face of a sheet is printed and then a print data for the obverse face of the sheet is printed. However, if it is judged that no print data for the reverse face of the sheet exists, the single face printing operation of printing only the print data for the obverse face of the sheet stored in the memory is immediately carried out without executing the printing operation for the reverse face of the sheet. Therefore, the time required for performing the printing operation is reduced, and printing efficiency is enhanced.

While the invention has been described in detail and with reference to specific embodiment thereof, it would be apparent to those skilled in the art that various changes and modifications may be made therein without departing from the spirit and scope of the invention.

What is claimed is:

1. A perfecting printer for printing images on at least one sheet having first and second faces on the basis of a series of print data inputted from an external device, the series of the print data including first print data and second print data to be printed on the first and second faces of the sheet, respectively, comprising:
    memory means for storing at least both of the first and second print data in the series of the print data;
    printing means for printing the first and second print data stored in said memory means on the first and second faces of the sheet, respectively, in this order;
    judging means for judging as to whether both of the first and second print data exist in said memory; and
    control means for controlling said printing means to print the first and second print data on both of the first and second faces of the sheet, respectively, when it is judged that both of the first and second print data exist in said memory means, and to print the second print data on the first face of the sheet when it is judged that the first print data does not exist in said memory means.

2. A perfecting printer as claimed in claim 1, wherein the first and second faces of the sheet are reverse and obverse faces of the sheet, respectively.

3. A perfecting printer as claimed in claim 1, wherein said control means erases the first and second print data in said memory means after both of the first and second print data are printed.

4. A perfecting printer as claimed in claim 1, wherein said memory means includes a page memory for storing the series of the print data, and an input buffer for temporally storing the series of the print data before the series of the print data are stored in said page memory.

5. A perfecting printer as claimed in claim 4, wherein said printing means comprises a character generator for generating image data on the basis of the print data stored in said page memory, and a printing unit for printing images corresponding to the image data on the first and second faces of the sheet.

6. A perfecting printer as claimed in claim 1, further comprising sheet reversing means having a sheet reversing path for passing the sheet therethrough to reverse the sheet.

7. A perfecting printer as claimed in claim 6, wherein when it is judged that the first and second print data are completely stored in said memory means, said control means controls said sheet reversing means to pass therethrough the sheet after the first print data has been printed on the first face of the sheet.

8. A perfecting printer as claimed in claim 6, further comprising sheet discharging means for discharging the sheet to an outside of said printer, and wherein when it is judged that the first print data does not exist in said memory means, said control means controls said sheet reversing means not to be driven and controls said sheet discharging means to discharge the sheet to the outside immediately after the second print data has been printed on the first face of the sheet.

9. A method of controlling a double-face printing operation of a perfecting printer including a page memory for storing a series of print data to be printed on at least one sheet having first and second faces, the print data including first print data and second print data to be respectively printed on the first and second faces in this order, and a control unit for controlling a printing operation of the printer on the basis of the series of the print data, comprising the steps of:
 storing the series of the print data into the page memory;
 judging as to whether both of the first and second print data exist in said memory; and
 printing the first and second print data on both of the first and second faces of the sheet, respectively, when it is judged that both of the first and second print data exist in said memory means, and printing the second print data on the first face of the sheet when it is judged that the first print data does not exist in said memory means.

10. A method as claimed in claim 9, further comprising a step of reversing the sheet after first print data has been printed on the first face of the sheet when it is judged that both of the first and second print data are stored in said page memory.

11. A method as claimed in claim 10, wherein said storing step comprises a step of storing the first and second print data into the page memory in this order.

* * * * *